United States Patent
Ballantine et al.

(10) Patent No.: US 8,197,978 B2
(45) Date of Patent: Jun. 12, 2012

(54) FUEL CELL SYSTEMS WITH FUEL UTILIZATION AND OXIDATION MONITORING

(75) Inventors: Arne Ballantine, Palo Alto, CA (US); Matthias Gottmann, Sunnyvale, CA (US); David Weingaertner, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1231 days.

(21) Appl. No.: 11/987,220

(22) Filed: Nov. 28, 2007

(65) Prior Publication Data

US 2008/0124590 A1    May 29, 2008

Related U.S. Application Data

(60) Provisional application No. 60/861,444, filed on Nov. 29, 2006.

(51) Int. Cl.
    *H01M 8/24* (2006.01)
(52) U.S. Cl. .................................................. 429/452
(58) Field of Classification Search .............. 429/12, 429/452
    See application file for complete search history.

(56) References Cited

U.S. PATENT DOCUMENTS

| 5,298,235 | A | 3/1994 | Worrell et al. |
| 5,925,476 | A * | 7/1999 | Kawatsu ................ 429/424 |
| 6,051,329 | A | 4/2000 | Fasano et al. |
| 6,689,499 | B2 | 2/2004 | Gillett et al. |
| 6,783,879 | B2 * | 8/2004 | Skala et al. ............ 429/420 |
| 6,794,070 | B2 | 9/2004 | Amrhein et al. |
| 7,235,323 | B2 | 6/2007 | Kuriyama et al. |
| 2003/0134166 | A1 * | 7/2003 | Skala et al. ............ 429/17 |

FOREIGN PATENT DOCUMENTS

| KR | 10-2002-0093979 A | 12/2002 |
| WO | WO 2004064184 A1 * | 7/2004 |

* cited by examiner

*Primary Examiner* — Bobby Ramdhanie
(74) *Attorney, Agent, or Firm* — The Marbury Law Group, PLLC

(57) ABSTRACT

A solid oxide fuel cell (SOFC) system includes at least one oxygen partial pressure sensor or at least one open circuit voltage fuel cell (OCVFC) sensor which is fluidly integrated with said SOFC system. Further embodiments include methods of operating a fuel cell system including the steps of providing the fuel cell system including a fuel cell stack and at least one open circuit voltage fuel cell sensor fluidly integrated with said fuel cell stack, supplying fuel to the system thereby causing the system to generate electrical energy, and using the signal from the sensor to monitor or adjust performance of the system.

15 Claims, 6 Drawing Sheets

FUEL CELL SYSTEMS WITH FUEL UTILIZATION AND OXIDATION MONITORING

CROSS-REFERENCE TO RELATED PATENT APPLICATIONS

This application claims priority to U.S. Provisional Patent Application No. 60/861,444, filed Nov. 29, 2006, which is incorporated herein by reference in its entirety.

FIELD OF THE INVENTION

The present invention relates generally to fuel cell systems and particularly to solid oxide fuel cell systems with sensors.

BACKGROUND

One of the biggest problems in managing fuel cell systems (especially high temperature fuel cell systems) is avoiding oxidation of the anode electrodes (i.e., the fuel electrodes). Oxidation of the anode electrode occurs when the oxygen partial pressure in the anode chamber increases to a point where the metallic anode is no longer stable. One commonly used metal in SOFC anodes is nickel which can form nickel oxide unless a reducing environment is maintained during SOFC operation.

Oxidation of the anode electrode generally causes a performance loss or degradation of the fuel cell. With nickel-containing electrodes, this performance loss is caused by the volume change of the nickel transitioning to nickel oxide. Upon re-reduction of the anode electrode (reversing the volume increase), the microstructure of the anode shows fractures which reduce the percolation of the nickel network in the anode and thereby limit the electrical conductivity of the anode. Depending on the nature of the oxidation and re-reduction, as well as the composition and microstructure of the anode, the damage due to oxidation can be anywhere between small and catastrophic.

Despite advances made in anode structure and composition towards reducing the impact of oxidation, a need for addressing oxidation and optimal fuel utilization still remains.

SUMMARY

Solid oxide fuel cell (SOFC) systems comprising sensors are described herein.

In one embodiment, the SOFC system comprises a SOFC, wherein said SOFC comprises a cathode electrode, a solid oxide electrode, an anode electrode and at least one oxygen partial pressure sensor fluidly integrated with said SOFC system.

In another embodiment, the SOFC system comprises a SOFC stack and at least one open circuit voltage fuel cell (OCVFC) sensor fluidly integrated with said SOFC system.

DETAILED DESCRIPTION

Embodiments of the present invention describe fuel cell systems, such as solid oxide fuel cell (SOFC) systems, with anode oxidation and fuel utilization monitoring capabilities. Other types of fuel cell systems may also be used. Fuel utilization which is sufficient to avoid oxidation of the anode electrode during system operation can determined based on the detected $O_2$ partial pressure. In one embodiment, one or more sensors are adapted to detect $O_2$ partial pressure to provide information regarding fuel utilization. The oxygen sensor or sensors may be integrated into the SOFCs or they may be positioned separately from the fuel cells, such as in the fuel exhaust stream.

In another embodiment, the sensor or sensors may comprise a SOFC at open circuit voltage ("OCV"). This sensor is adapted to detect moisture or steam to carbon ratio in the fuel stream or streams.

The output of from the sensors may be provided to a display or to a computer. The sensors may be coupled to a feedback system, such as a controller, for example a computer, and computer controlled valve, for continuous adjustment of the fuel flow characteristics, such as fuel utilization, steam to carbon ratio, fuel inlet flow rate, etc.

The sensors described in embodiments of the present invention are preferably fluidly integrated with a SOFC system. As such, the sensors are in contact with at least one gaseous stream flowing within said system.

Figure 1:
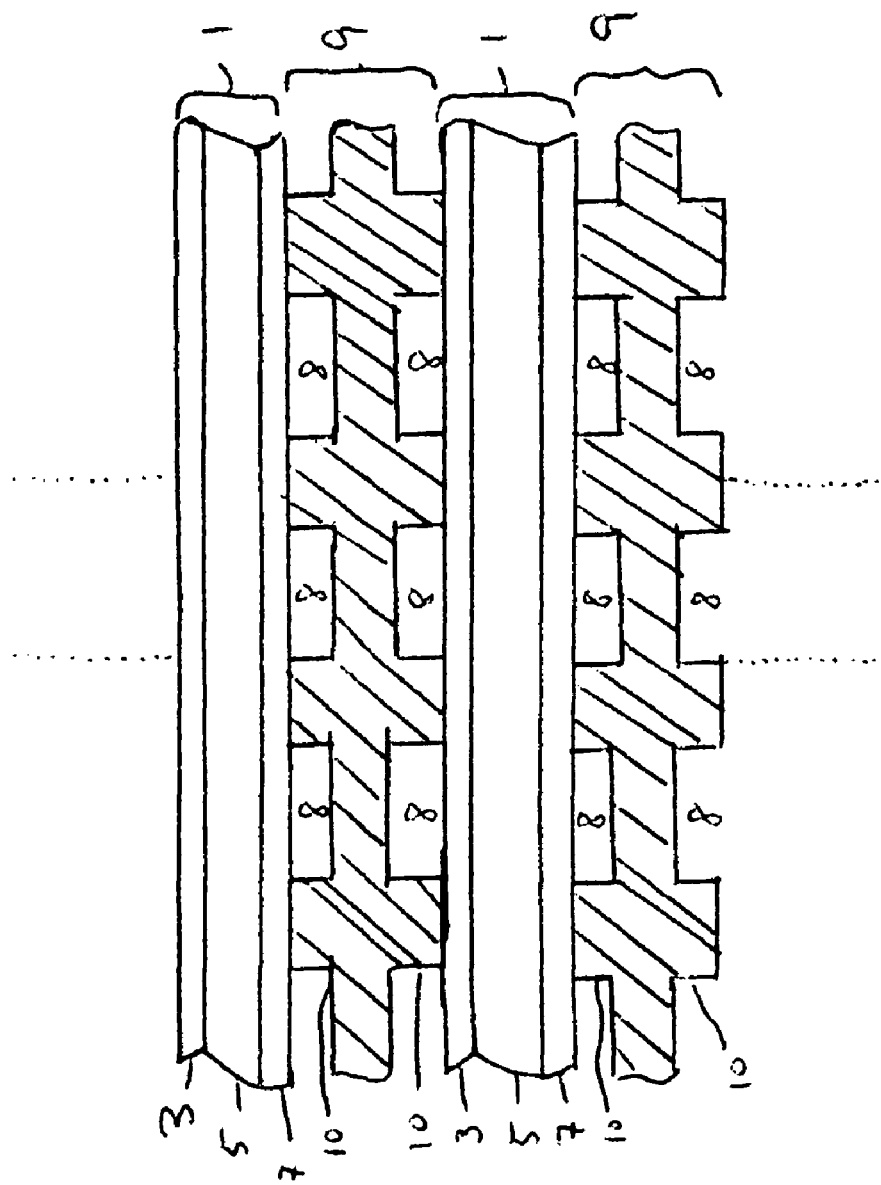
FIG. 1 depicts one of many fuel cell stack arrangements that may be employed in embodiments of the invention.

A SOFC typically contains a ceramic electrolyte, such as a stabilized zirconia (for example yttria or scandia stabilized zirconia), an anode or fuel electrode, such as a nickel-stabilized zirconia cermet, and a cathode or air electrode, such as LSM. An exemplary SOFC stack is illustrated in FIG. 1 where two adjacent fuel cells of a fuel cell stack are shown. FIG. 1 illustrates a fuel cell stack in which each fuel cell 1 comprises a cathode electrode 7, a solid oxide electrolyte 5, and an anode electrode 3. The interconnect/gas flow separator 9 (referred to as an interconnect/gas flow separator plate in a planar stack) contains gas flow passages or channels 8 between ribs 10. The plate 9 electrically interconnects the adjacent cells in the stack and separates the fuel and air flow streams.

In the first embodiment, oxygen partial pressure in the fuel exhaust stream is measured, for example, to optimize the fuel utilization. One important operating parameter of a high temperature fuel cell stack is the amount of excess fuel provided to the stack, the inverse of which is known as fuel utilization. In a fuel cell power generator (e.g. SOFC system) without selective recycling of exhaust gases, the amount of unconverted fuel left in the exhaust stream has a key role in determining system power generation efficiency. Ideally, a fuel cell would be operated at 100 percent fuel utilization thereby making maximum use of the calorific value of the fuel. However, challenges arise when the fuel cell exhaust approaches complete conversion. Most anode electrodes used in today's high temperature fuel cells require a reducing environment at all times. If the anode electrodes experience excessive oxygen partial pressure, they oxidize and suffer at least some irreversible damage. In fact, it is normally assumed that most damage sustained in the operation of a fuel cell occurs via partial oxidation of the anode. Measurement of partial pressure of flow components, such as $O_2$, in the exhaust stream can enable immediate determination of the fuel utilization. A control system or an operator can adjust or meter the inlet fuel flow based on the determination and provide stack operation at higher fuel utilization.

As noted above, the system of the first embodiment may contain one or more oxygen sensors which detect partial pressure of oxygen in a fuel exhaust stream. The detected data is output to a display, directly provided to a controller which adjusts the fuel flow rate, or both. Furthermore, data from the sensors may be routed to a simple feedback loop for continuous adjustment of system variables such as fuel flow rate, steam to carbon ratio, etc. Plural sensors may be distributed in plural locations throughout the stack fuel exhaust conduit, fuel inlet conduit or anode chamber to measure the oxygen partial pressure at multiple locations. In this case, fuel maldistribution can be detected and fuel utilization controlled appropriately.

Oxygen sensors may take on different forms but usually comprise an oxygen ion conducting ceramic material with electrodes on opposite sides of the ceramic material. Changes in electrical signal from such sensors can be correlated to changes in $O_2$ partial pressure. Such sensors typically require elevated temperatures for sufficient oxygen ion conductivity. Therefore in one aspect of the present invention, the sensors are maintained at sufficiently elevated temperatures such as via an external heater. In yet another aspect of the invention, a fuel cell stack, (or the system comprising the stack) is run at sufficiently high temperatures to promote oxygen ion conductivity in the oxygen sensors.

The sensors may be either potentiometric or amperometric type. In a potentiometric sensor, a voltage due to an oxygen partial pressure difference (exhaust stream versus a reference gas) is measured. The reference gas may be external to the fuel cell or a part of the fuel cell system gas flows. For example, the $O_2$ partial pressure at the cathode may be used as a reference gas. In the amperometric sensor, the current induced by an applied potential is measured.

Figure 2:
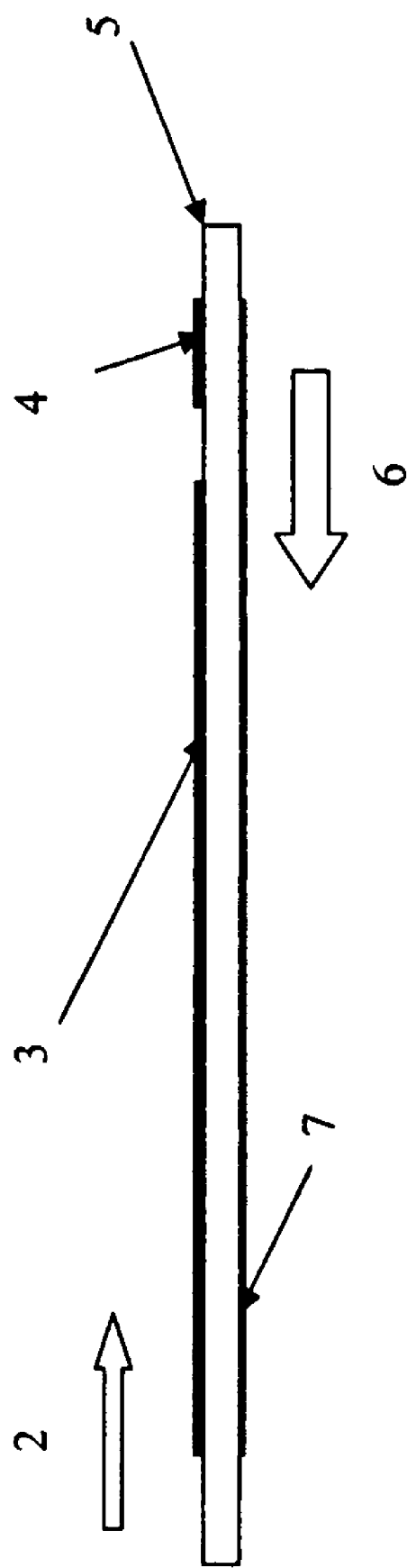
FIG. 2 depicts a side cross sectional view of a fuel cell with an integrated oxygen sensor.

In a configuration of the first embodiment, the sensor component is integrated into the fuel cell itself. The oxygen ion conducting ceramic electrolyte 5 of the fuel cell itself provides the sensing function. This embodiment is schematically shown in FIG. 2. At the outlet end of the anode stream, a dedicated electrode 4 (oxygen sensor electrode) electrically isolated from the main anode 3), with a counter electrode, which can be either a separate electrode or part of the cathode electrode 7 creates an electrical potential which by the Nernst Equation can be related to the oxygen partial pressure in the fuel exhaust stream. FIG. 2 depicts a counter flow configuration where fuel flow direction 2 and air flow direction 6 are opposite each other. In this scenario, it is especially convenient to determine the fuel outlet oxygen partial pressure since the oxygen partial pressure at the counter electrode is well known (fresh air.) However, the same scheme can also be used in cross or co-flow configurations. Here, either a slightly reduced accuracy has to be accepted or an approximate correction can be calculated based on current and air flow rate. If more precise measurement is required, the counter electrode (opposing the oxygen sensor electrode) can be exposed to a known oxygen partial pressure such as ambient air or any other source of known oxygen partial pressure. If desired, the integrated oxygen partial pressure sensors can be incorporated into each fuel cell within a stack making up the fuel cell power generation system. It is also possible to incorporate multiple sensors in one single cell thereby obtaining a measure of the flow distribution quality in this layer. For example, plural isolated oxygen sensor electrodes may be formed on the anode side of the electrolyte. In an extension of this embodiment, a sensor can be built to detect the oxygen partial pressure in the air stream.

In another configuration of the first embodiment, the oxygen sensors can be located separately from the fuel cells. That is, the sensors can be located throughout the SOFC system such as in the fuel exhaust conduit, fuel inlet conduit or anode chamber.

In another embodiment, the fuel system comprises an open circuit voltage fuel cell (OCVFC) sensor. Preferably, the OCVFC comprises a solid oxide OCVFC in which the fuel cell stack comprises a SOFC stack. However, other fuel cell system types, such as molten carbonate fuel cell systems may be used. This sensor may be used to monitor the partial pressure and/or ratio of gaseous species provided to or exiting from a fuel cell or a fuel cell stack. The OCVFC can advantageously serve as an inferential sensor in a balance of plant (BOP) and/or fuel cell stack(s.) In one aspect of this embodiment, the OCVFC is not in electrical series with at least one fuel cell or fuel cell stack. That is, the OCVFC generates voltage/current independently of at least one stack and separately outputs the same. The output voltage/current may be provided to a display, volt meter, ammeter, system controls, or any other signal receiver of interest. Furthermore, the voltage/current may be routed to a control device in simple feedback loop for continuous adjustment of the system conditions such as fuel flow rate, fuel component ratio, temperature and other adjustable variables. Of course one may desirably couple the system controls and the sensor via a feedback loop to continuously adjust for optimal operational conditions. A plurality of such sensors can be distributed about a SOFC system comprising fuel cells or fuel cell stacks, preferably where said sensors are in contact with the gases provided to the fuel cell. Optimal locations include, but are not limited to: fuel inlet conduit, fuel exhaust conduit and inside the anode chamber. However, the sensors may be placed anywhere gases of interest flow through.

There are various practical issues that may be addressed via OCVFC sensors. Decreasing the steam to carbon ratio in certain fuel cell systems is economically beneficial, but also increases the risk of coking in the balance of plant (BOP) and fuel cells. Furthermore, measurement and control of moisture in the reformer (or anode gas recycle) is typically challenging. An OCVFC sensor is a great solution because it can provide a good indication of how much moisture is in the fuel inlet and/or exhaust. Control of the fuel cell system is provided by determining set points for the inferential measurement in the fuel cell system control software. The fuel cell at OCV can be used to infer steam/carbon ratio in the anode feed gas (i.e. the fuel inlet stream.) The cathode could be exposed to the cathode feed gas, the atmosphere or a sealed chamber containing oxygen. The sealed chamber could contain a small amount of water so that the $O_2$ content could be replenished by temporarily switching the OCVFC into electrolysis mode. Water feed rate or anode gas recycle flow rate (anode recycle blower speed) could be the quantity manipulated by the control system to maintain the set point on fuel cell OCV. The fuel cell at OCV can be used to infer the presence of oxygen in the anode feed gas and/or the oxygen concentration or $O_2$ stoichiometric ratio. For determining the oxygen concentration or $O_2$ stoichiometric ratio, the OCVFC can be located in the cathode exhaust conduit. The encapsulated side of the fuel cell could contain $H_2$ which would be regenerated by electrolyzing water. Main air inlet flow (i.e. air blower speed) could be the quantity manipulated by the control system to maintain the set point on the OCVFC.

Figure 3:
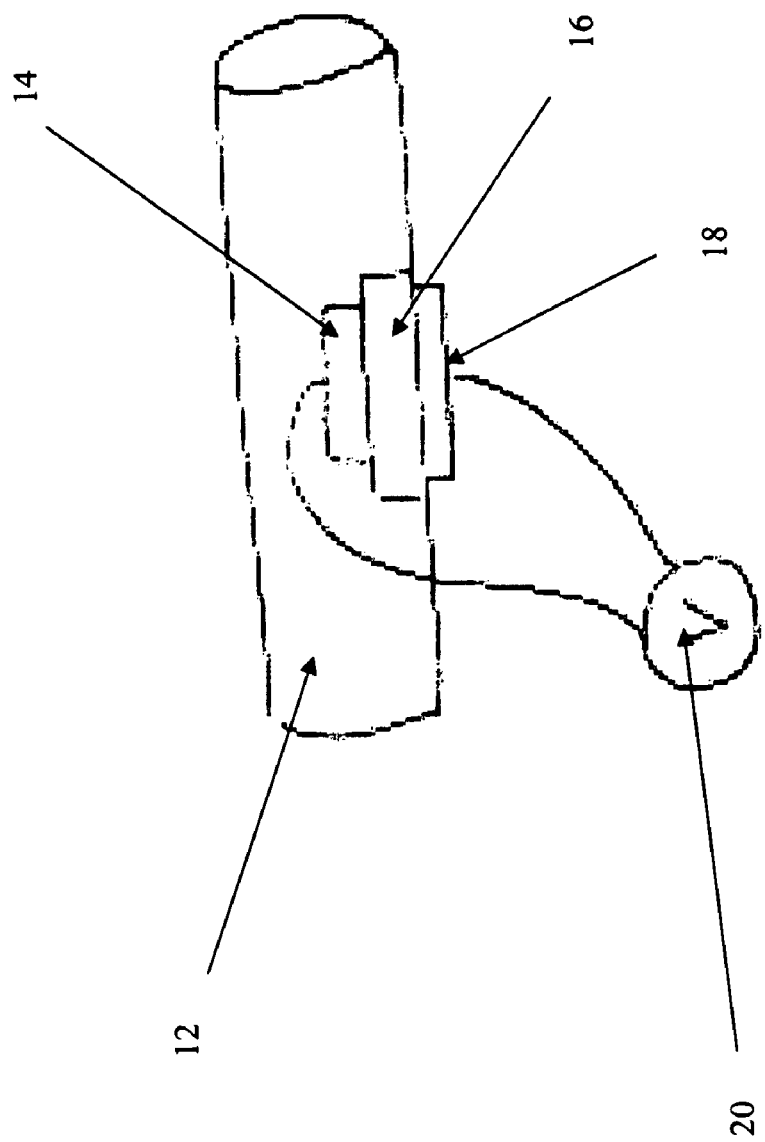
FIG. 3 depicts a gas flow conduit with a sensor integrated into the conduit wall.
Figure 4:
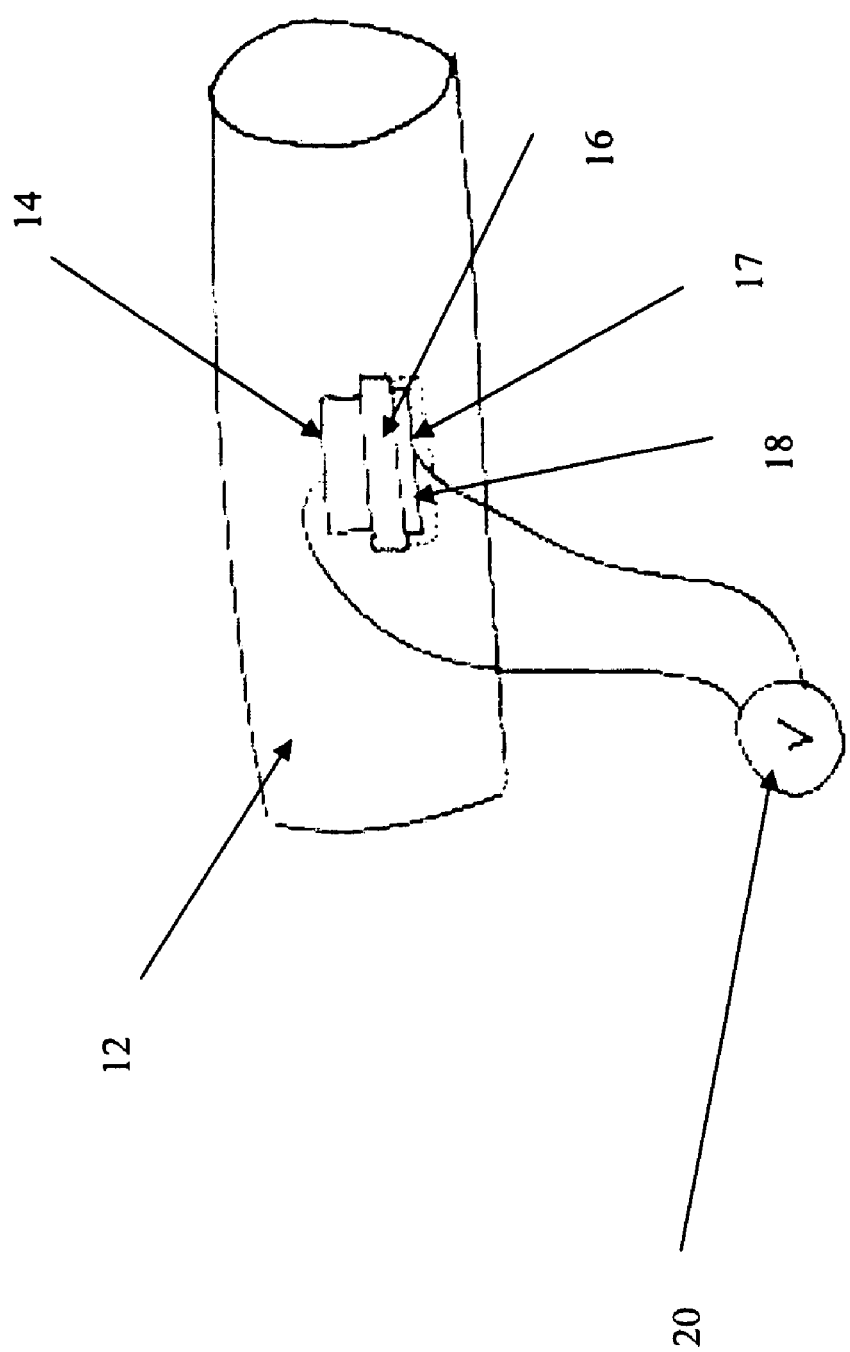
FIG. 4 depicts a gas flow conduit with a sensor disposed therein.
Figure 5:
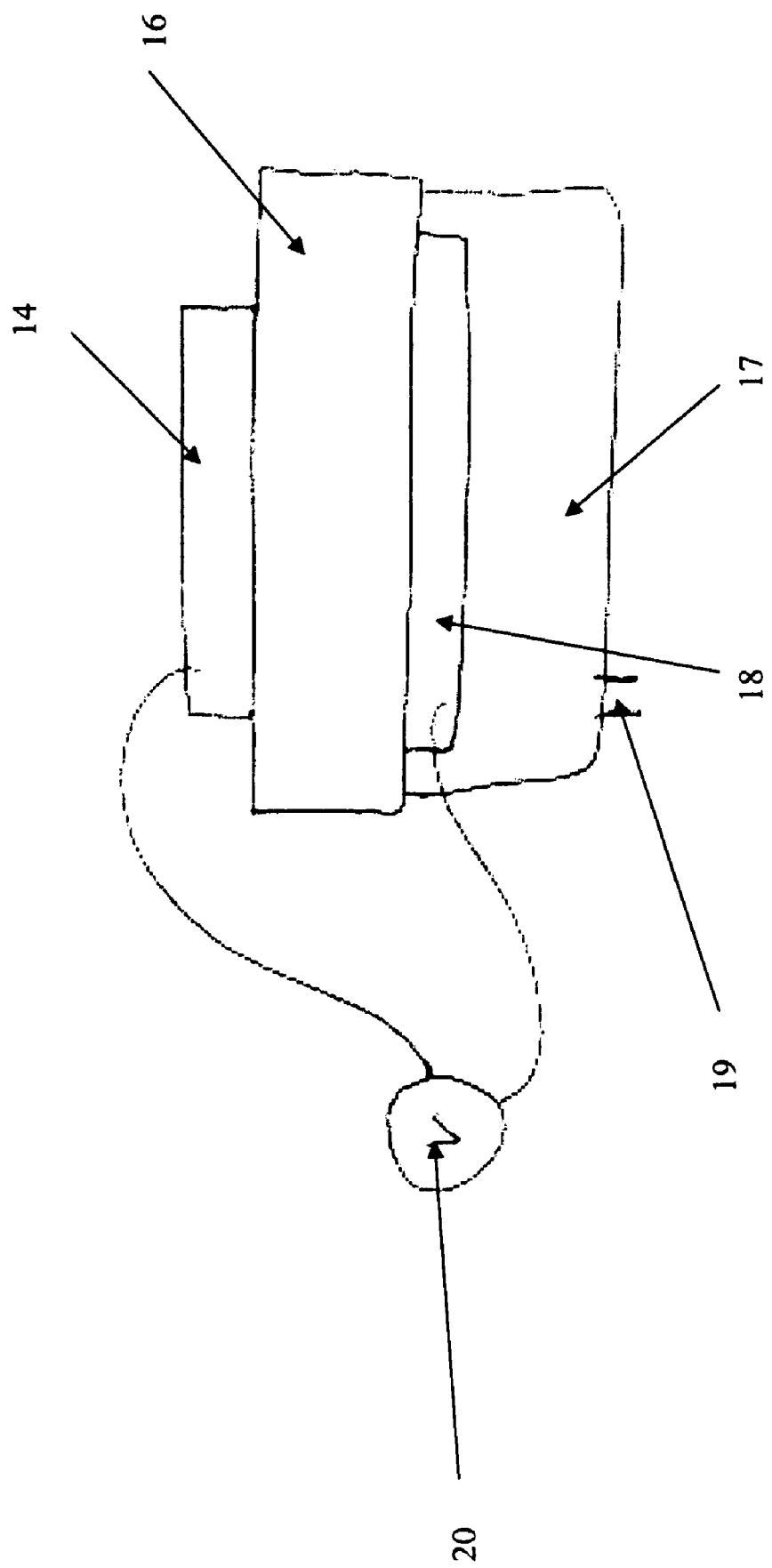
FIG. 5 depicts a magnified view of the sensor of FIG. 4.

The OCVFC sensor can be installed such that it completely resides in a conduit 12 (as shown in FIGS. 4 and 5) or is integrated into a wall of a conduit. As shown in FIG. 3, the anode 14, and optionally the solid oxide electrolyte 16 can be exposed to the gas (e.g. air or fuel) conveyed in the conduit while the cathode 18 is not exposed to said gas. As shown, the cathode is in contact with the solid oxide electrolyte so as to enable normal ionic conduction there between. The anode and the cathode are each coupled to a device 20 for reading the electrical signal produced by the sensor, where said device can be a voltmeter (e.g. high impedance voltmeter or, ammeter, which can be connected to a display device, systems controls or any other appropriate device. In some cases, as shown in FIGS. 4 and 5, the cathode electrode 18 is sealed in a chamber 17 comprising $O_2$. For supply or venting of the $O_2$ gas, the chamber 17 may be fitted with an outlet 19. The voltage response from the sensor is temperature dependant. If desired, the sensor, such as the sensor of FIG. 5, may include have one or more integrated thermocouples: one to sense the temperature, and one or more additional thermocouples for redundancy in case of failure. Alternatively, but less preferably, an external thermocouple may be located in the neighborhood or adjacent to the sensor. A computer or other data processor can correlate the voltage response the sensor to the temperature measured by the thermocouple(s).

OCVFCs can be coupled to one another, coupled to the same device or each operate independently. For instance two or more may be coupled to the same device to read signals relative to one another, such as for example signal from a sensor at fuel inlet and one at the fuel outlet. As previously noted, the overall system can be automated for optimal operating conditions by continuously monitoring sensor-generated data and making appropriate adjustments.

Generally, a method of using the sensors of embodiments of the present invention in a fuel cell system involves: providing a SOFC system fluidly integrated with a sensor, supplying fuel to said fuel cell thereby causing the fuel cell to generate electrical energy; and using the signal obtained from the sensor to monitor performance of the fuel cell, adjust operational conditions of the fuel cell or both.

A detailed non-limiting description of how a OCVFC can be used as a sensor is as follows.

A database is generated via an OCVFC sensor for subsequent comparative use. For example, the sensor is maintained at a known temperature while fuel mixture(s) with variable steam to carbon ratio is provided to said sensor. Accordingly, the voltage or current output of the sensor with each different steam to carbon ratio (at constant known temperature) is recorded as a single data point. This is repeated over a desired range of fuel component ratios and temperatures resulting in a database correlating signal from the sensor and known temperature with the corresponding steam to carbon ratio in the fuel.

Next, a SOFC system is provided wherein at least one OCVFC sensor is installed at desired locations therein. Preferred locations for the sensors includes fuel inlet conduit, fuel exhaust conduit or anode chamber.

Fuel is provided to the system and thus also the OCVFC sensor by virtue of its location within said system. The measured temperature value and signal (current or voltage) output from the sensor is then compared with the aforementioned database to infer (i.e., to inferentially determine) the steam to carbon ratio in the fuel mixture. The stream to carbon ratio in the fuel inlet stream may be adjusted by an operator or automatically by a control system if the determined steam to carbon ratio is outside a predetermined range.

As shown in the figures provided, a power generation system comprising a fuel cell or a fuel cell stack can be fitted with sensors at a plurality of locations. It should be noted, however, that construction of fuel cells can vary greatly. While planar fuel cells are shown, one skilled in the art should be able to easily adapt for other types such as cylindrical arrangements and the like.

Figure 6:
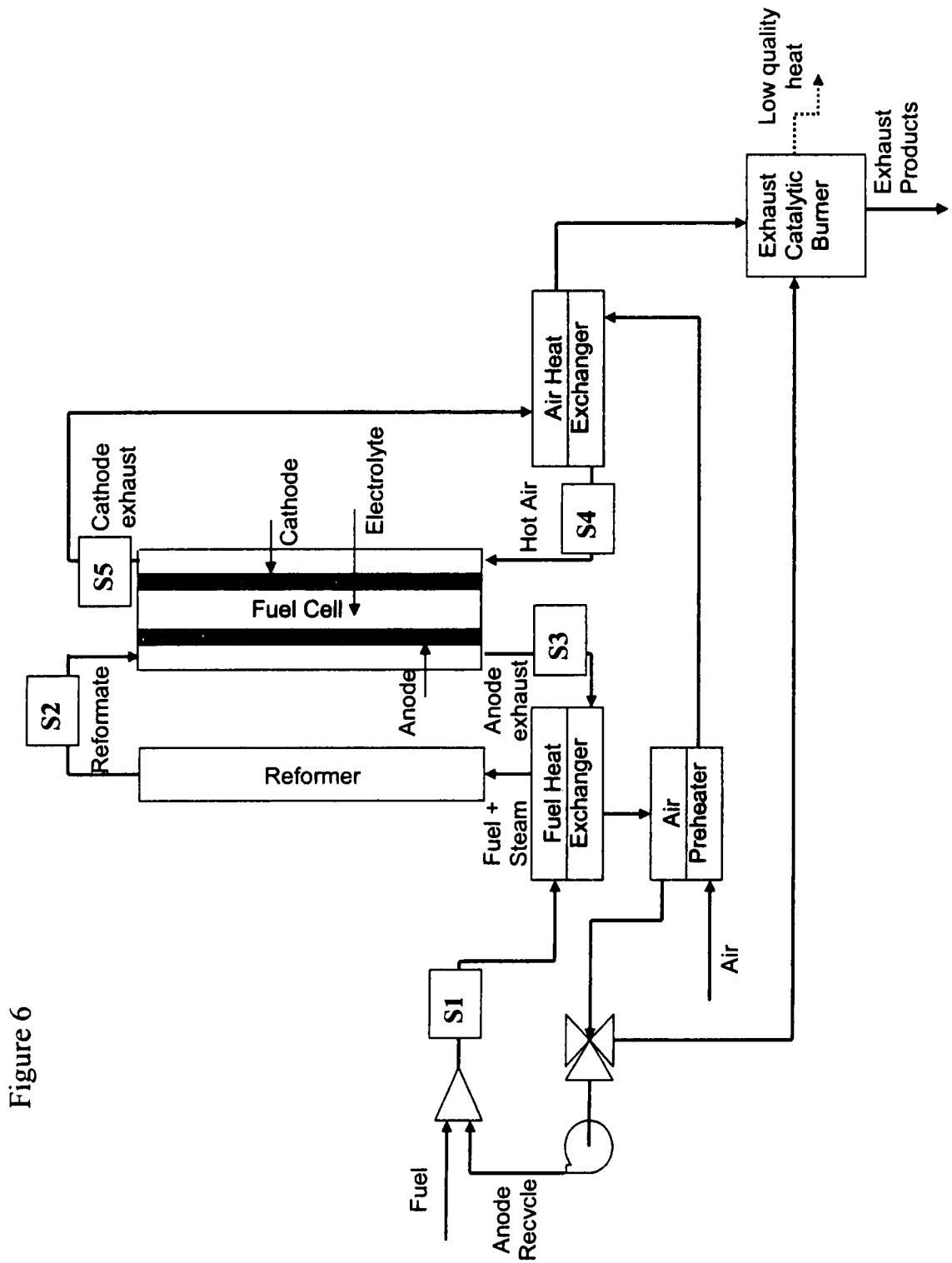
FIG. 6 depicts a schematic of power generation system with sensors installed at various locations therein.

As illustrated in FIG. 6, useful locations for sensors of the present embodiments include, but are not limited to, one or more of the following: in the fuel inlet conduit after the fuel is humidified, downstream from fuel/$H_2O$ (g) mixer but upstream from the reformer at location S1; in the fuel inlet conduit at location S2 downstream from the reformer; in the fuel exhaust (anode exhaust) conduit at location S3; in the air inlet conduit at location S4 or in the air exhaust conduit in location S5. As noted above, the OCVFC may be integrated with a reformer or other components of non-SOFC fuel cell systems, such as molten carbonate fuel cell systems, in order to guard against a failure of the water sub-systems.

The system shown in FIG. 6 is described in more detail in U.S. application Ser. No. 11/491,487 filed on Jul. 24, 2006 and incorporated herein by reference.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method of operating a fuel cell system comprising: (a) providing the fuel cell system comprising: a fuel cell stack; and at least one open circuit voltage fuel cell (OCVFC) sensor, wherein the at least one open circuit voltage fuel cell (OCVFC) sensor comprises a fuel cell, fluidly integrated with said fuel cell stack; (b) supplying fuel to the system thereby causing the system to generate electrical energy; (c) using the sensor to determine an oxygen to carbon ratio or a steam to carbon ratio; and (d) using the ratio determined from the sensor to monitor or adjust performance of the system.

2. The method of claim 1 wherein step (c) comprises using the sensor to inferentially determine the steam to carbon ratio in the fuel provided to the system.

3. A method of operating a fuel cell system comprising:
(a) providing the fuel cell system comprising:
a fuel cell stack; and
at least one open circuit voltage fuel cell (OCVFC) sensor fluidly integrated with said fuel cell stack;
(b) supplying fuel to the system thereby causing the system to generate electrical energy;
(c) using the sensor to determine an oxygen to carbon ratio or a steam to carbon ratio; and
(d) using the ratio determined from the sensor to monitor or adjust performance of the system, and
wherein step (c) comprises comparing a signal from said sensor to values stored in a database to inferentially determine the steam to carbon ratio.

4. The method of claim 3 further comprising adjusting the steam to carbon ratio in the fuel if the determined steam to carbon ratio is outside a range.

5. The method of claim 3 wherein the sensor is not in electrical contact with the fuel cell stack.

6. The method of claim 3 wherein the sensor is located in the fuel cell stack anode chamber, in a fuel inlet conduit or in a fuel exhaust conduit.

7. The method of claim 3 wherein the fuel cell stack comprises a SOFC stack.

8. The method of claim 1 further comprising measuring a temperature at or adjacent to the sensor, and correlating the sensor signal to the measured temperature.

9. The method of claim 1 wherein the sensor is located in a fuel inlet conduit.

10. The method of claim 9 wherein step (c) comprises using the sensor to determine the oxygen to carbon ratio in the fuel provided to the system.

11. The method of claim 10 further comprising adjusting the oxygen to carbon ratio in the fuel if the determined oxygen to carbon ratio is outside a range.

12. The method of claim 1 wherein the sensor is located in a fuel exhaust conduit.

13. The method of claim 12 wherein step (c) comprises using the sensor to determine the oxygen to carbon ratio in the fuel exhaust.

14. The method of claim 13 further comprising adjusting the oxygen to carbon ratio in the fuel exhaust if the determined oxygen to carbon ratio is outside a range.

15. The method of claim 14 further comprising adjusting the oxygen to carbon ratio in the fuel exhaust to adjust overall fuel utilization.

* * * * *